Oct. 10, 1950  J. C. LUNSFORD  2,525,306
DOUGHNUT GLAZING MACHINE
Filed Feb. 19, 1946  3 Sheets-Sheet 1
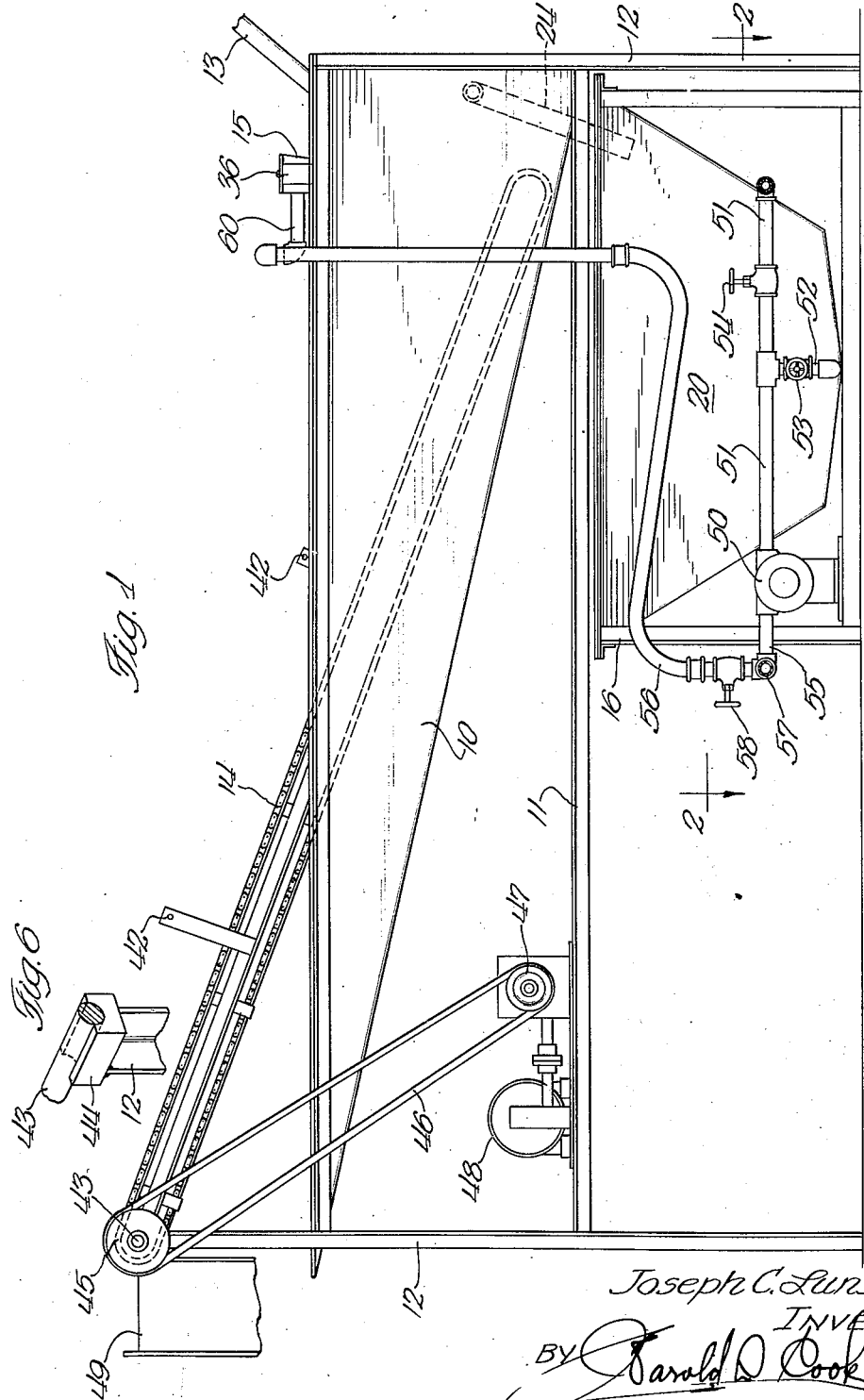
Joseph C. Lunsford
INVENTOR
BY Harold D. Cook
ATTORNEY Oct. 10, 1950  J. C. LUNSFORD  2,525,306
DOUGHNUT GLAZING MACHINE
Filed Feb. 19, 1946  3 Sheets-Sheet 2
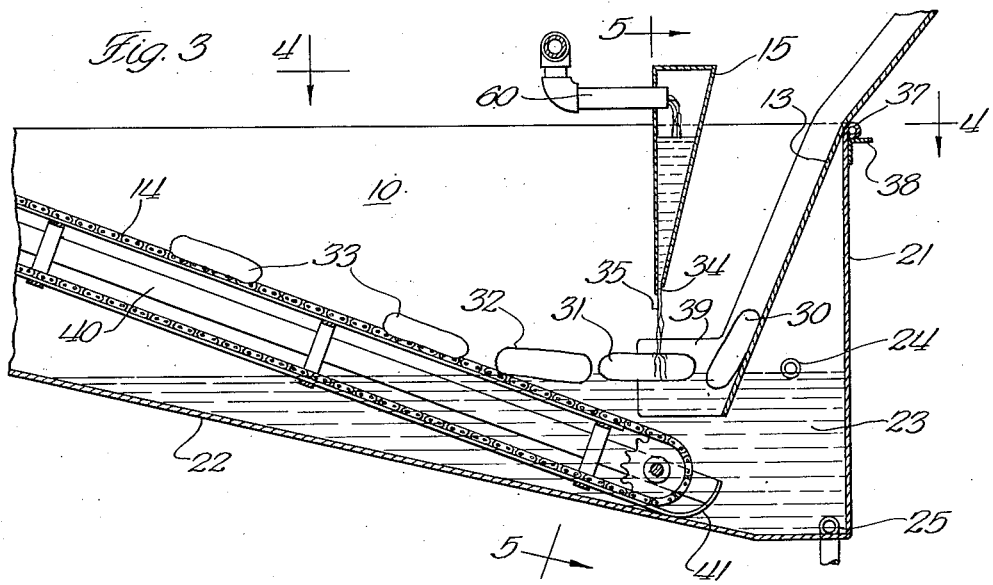
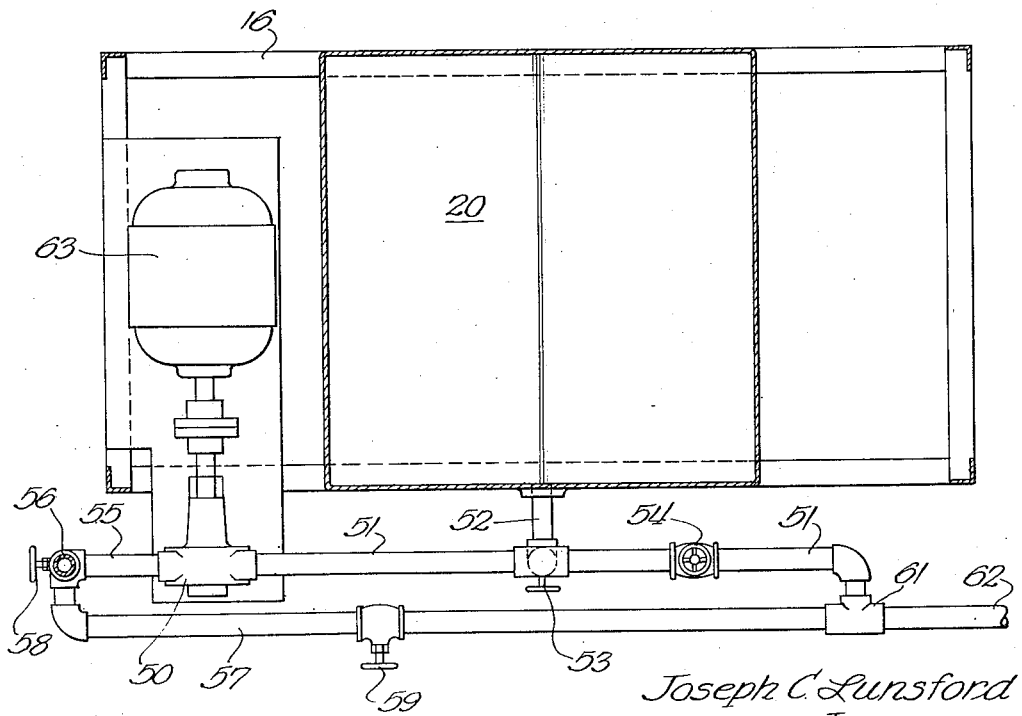
Joseph C. Lunsford
INVENTOR
BY Harold D. Cook
ATTORNEY Oct. 10, 1950   J. C. LUNSFORD   2,525,306
DOUGHNUT GLAZING MACHINE
Filed Feb. 19, 1946   3 Sheets—Sheet 3
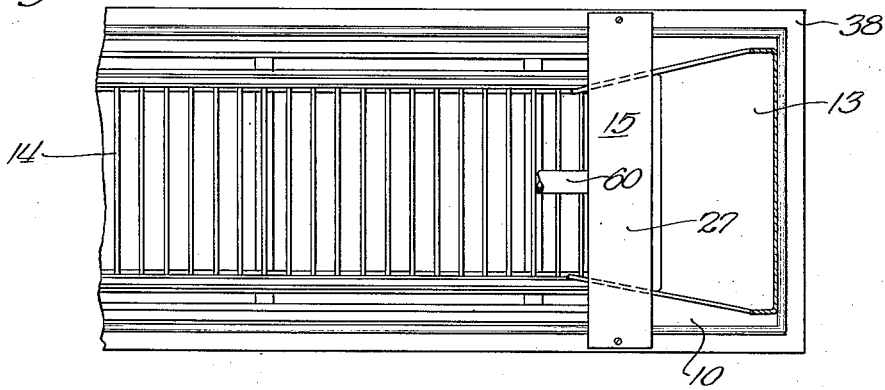
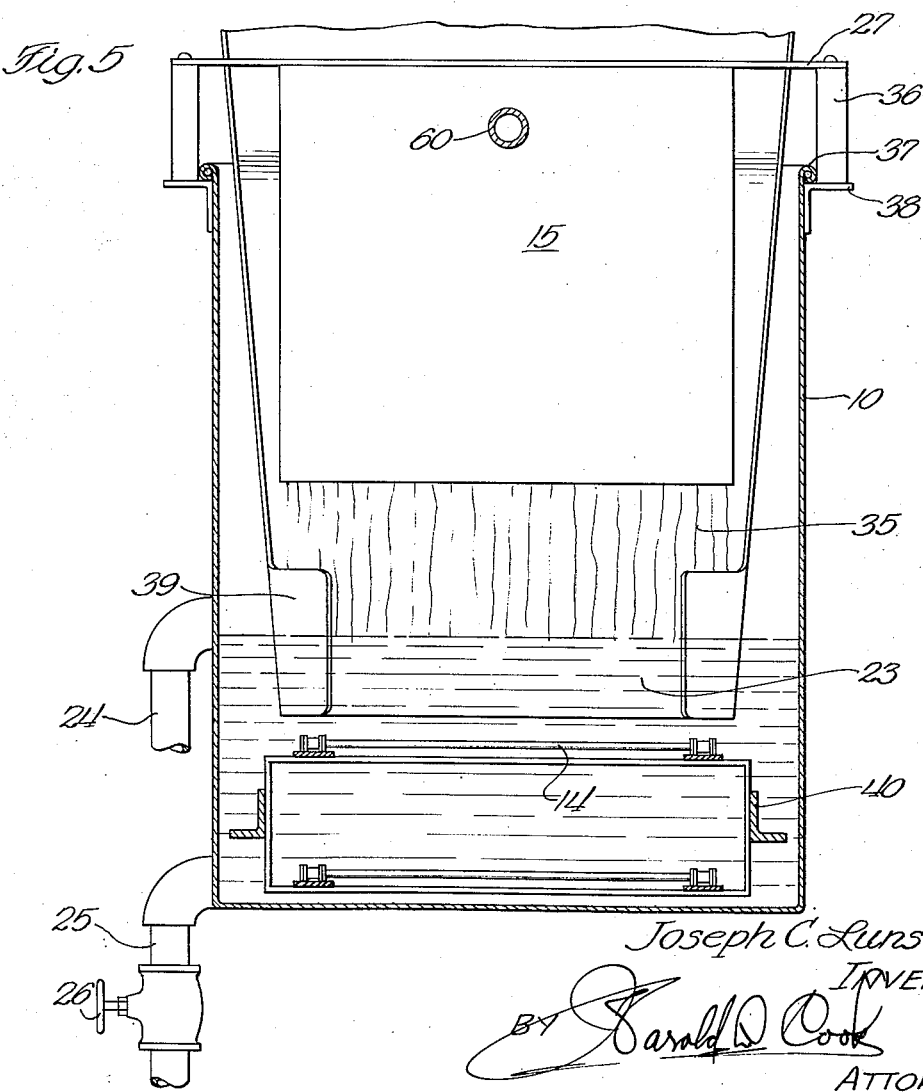
Joseph C. Lunsford
INVENTOR
BY Harold D. Cook
ATTORNEY Patented Oct. 10, 1950

2,525,306

UNITED STATES PATENT OFFICE 2,525,306

DOUGHNUT GLAZING MACHINE

Joseph C. Lunsford, Portland, Oreg., assignor to H. C. Rhodes, Portland, Oreg.

Application February 19, 1946, Serial No. 648,713

9 Claims. (Cl. 91—2)

1

This invention relates to a machine for applying a glazing or similar coating to doughnuts and other comestibles.

The general object of the invention is to provide a glazing machine which will operate automatically to apply such a coating to comestibles as they are discharged from a cooking machine.

A primary object of the invention is to provide an improved apparatus for applying glazing material uniformly to all surfaces of light, raised doughnuts.

A further object is to provide a glazing machine having a removable conveyor mechanism in a glazing or dipping vat which may easily be drained and cleaned to prevent freezing of the glazing materials in the vat and in such parts of operating mechanism that must necessarily be submerged therein.

A further object is to provide a convenient arrangement for circulating liquid glazing material when the machine is in operation and for pumping the material into a storage container when the entire system is drained.

These and other objects are accomplished in the preferred embodiment of glazing machine hereinafter described and claimed with reference to the accompanying drawings. The present machine comprises, in general, a dipping vat supported on a portable frame of sufficient height to receive doughnuts directly from a conventional doughnut cooking machine and to allow clearance thereunder for a glazing tank and pumping equipment on a second portable frame. The dipping vat is formed with a deep end into which doughnuts are plunged down a slide or delivery chute as they are discharged from the cooking machine. Liquid glazing material is maintained at a level in the vat to float light comestibles such as doughnuts toward a conveyor which raises them out of the liquid and drains them as they are carried along above an extended sloping bottom in the tank. A distributing trough is disposed in the vat to pour a sheet-like stream of glazing material over the doughnuts as they progress toward or upon the conveyor, and provision is made for adjusting the position of this trough to cause the stream therefrom to assist in propelling the floating doughnuts in the proper direction.

In the drawings:

Figure 1 is a general view of the present glazing machine in side elevation;

Figure 2 is a plan view of the glazing tank and pumping system taken on the line 2—2 of Figure 1;

Figure 3 is an enlarged longitudinal sectional view through the lower end of the dipping vat;

Figure 4 is a plane view of the lower end of the dipping vat taken on the line 4—4 of Figure 3;

Figure 5 is a cross sectional view through the

2 dipping vat taken on the line 5—5 of Figure 3; and

Figure 6 is a fragmentary view showing the manner of removably supporting the upper end of the doughnut conveyor.

As illustrated in Figure 1, the numeral 10 designates a dipping vat carried in an open framework 11 supported by legs 12 in such a manner as to render the device easily portable. Doughnuts are introduced into this vat from a doughnut machine by a slide or chute 13 at a deep end of the vat and are removed from the vat on a portable conveyor 14. During their brief travel through the deep end of the vat, the doughnuts are completely coated with liquid glazing material, first, by being plunged into this material at the bottom of the chute 13, and second, by being caused to pass beneath and through a sheet like stream of glazing material discharged in a constant flow from a distributing trough 15. The present machine further includes a smaller frame 16 for a glazing tank 20 and associated pumping mechanism adapted to be positioned under the dipping vat 10 in the manner illustrated.

The dipping vat 10 has a deep end where the doughnuts are received over the edge of a vertical end wall 21. A long sloping bottom 22 extends substantially from the end wall 21 the entire length of the conveyor 14 to catch liquid dripping therefrom while the doughnuts are draining during their upward travel on the conveyor. The glazing material 23 which may comprise sugar and water or other liquid icing is maintained at a constant level by means of an overflow pipe 24 which discharges into the tank 20. The numeral 25 designates an outlet pipe in the bottom of the vat equipped with a valve 26 which may be opened to drain the vat into the tank 20 or which may be cracked to maintain a liquid level below the overflow 24. When the machine is operating, liquid is supplied to the trough 15 at a rate much faster than it can be removed by the coatings adhering to the doughnuts and so a constant discharge takes place through the overflow pipe 24 to maintain the desired liquid level in the dipping vat. The piping and pumping arrangements for maintaining this flow will be hereinafter described in detail.

The present machine is designed so that it may be positioned adjacent the doughnut cooking machine with the upper end of the slide 13 in a position to receive cooked doughnuts as they are discharged therefrom. As the doughnuts come down the slide 13 from the doughnut machine, they plunge into the liquid 23 in the manner of the doughnut 30 in Figure 3. Raised doughnuts, however, are so light and buoyant that they will not submerge themselves in such a fall and consequently become wetted with glazing material only on one side as they float into the position of the doughnut 31 beneath the distributing trough 15, pushing along the preceding doughnut 32 if it has not already moved out of the way. The numeral 33 designates doughnuts which have previously floated over to the conveyor 14 and have been raised out of the liquid 23 and out of the way of the doughnuts 32 and 31.

The bottom of the distributing trough 15 opens in a narrow slit 34 extending the width of the vat 10 to discharge a thin sheet of liquid 35 over the tops of the doughnuts as they pass therebeneath. The parts are proportioned and arranged so that the stream 35 also serves the additional useful function of propelling the doughnuts toward the conveyor 14 to prevent their piling up at the bottom of the chute 13. In order to accomplish this purpose, the trough 15 is hung from a cross bar 27 which is supported at its ends on feet 36 which may rest either on the top rim 37 of the vat 10 or on top longitudinal rails 38 of the frame 11, so that the trough may be set at different distances from the slide 13. This adjustment may be rather critical with very light, raised doughnuts in order to keep the doughnuts moving properly and can be accomplished only after the machine is set in operation and is receiving doughnuts at regular intervals from the cooker. If the trough 15 is set too far from the slide 13, the floating doughnuts may not penetrate the stream 35, but may be pushed back toward the slide 13 to obstruct the path of the next doughnuts down the slide. If the stream 35 is moved too close to the chute 13, the effect of its propelling action may be dissipated before the doughnuts are picked up by the conveyor 14 with the result that they may obstruct the next doughnuts to come along and interfere in general with the progressive movement from the chute 13 to the conveyor 14. When the trough 15 is set in the proper position with the parts proportioned approximately as shown, the momentum of the doughnut after it leaves the slide 13 will carry its leading edge through the stream 35 whereupon the downward pressure of the stream 35 on the after parts of the doughnut exerts a sufficient forward reaction on the doughnut to keep it moving toward the conveyor. It is to be understood, however, that the successive doughnuts do not have to follow each other as closely as shown in Figure 3 in order to make the machine operate successfully. The maximum feed rate of the machine is determined by the speed of the conveyor 14 and the time required for the doughnuts to move through the liquid from the slide 13 to the conveyor. The machine will operate satisfactorily at any slower feed rate because each doughnut can independently negotiate the distance from the slide 13 to the conveyor without any pushing action from the doughnut behind. To direct the doughnuts toward the conveyor 14 and away from the sides of the vat, deflecting ears 39 are extended from the lower side portions of the chute 13 in the manner shown.

If the slide 13 and conveyor 14 are brought relatively closer together, either by moving the bottom of the slide or by lowering the liquid level by cracking the drain valve 26, the propelling action of the stream 35 may not be necessary, and then the trough 15 may be shifted to a position over the conveyor in the general region of the lower doughnut 33.

The conveyor 14 is mounted on a portable frame 40 having a lower end 41 adapted to rest on the sloping bottom 22 of the vat and has one or more handles 42 for lifting the whole conveyor assembly bodily out of the vat. The shaft 43 for the driving sprockets at the upper end of the conveyor rest loosely in semi-cylindrical bearing blocks 44 carried by the upper ends of the legs or posts 12 as shown in Figure 6. When the machine is assembled for operation, a pulley 45 on one end of the shaft 43 is connected by means of a belt 46 with a pulley 47 driven by a motor 48 mounted at a lower level on the frame 11. By removing the belt 46, the conveyor may be bodily lifted out of the vat without the use of tools. Numeral 49 designates a gravity slide into which the doughnuts are discharged by the conveyor 14 after they have drained and cooled in the course of their upward travel.

The distributing trough 15 is supplied by a pump 50 having an intake pipe 51 connected with a branch pipe 52 through a valve 53 which may be opened to withdraw liquid from the bottom of the tank 20. Beyond its juncture with the pipe 52, the pipe 51 has a valve 54 which is closed while the pump is drawing from the tank. On the discharge side of the pump, the pipe 55 is connected with a pair of pipes 56 and 57 having valves 58 and 59, the former being open and the latter closed when the machine is operating. The pipe 56, which preferably includes one or more flexible sections, extends upwardly on the outside of the frames 16 and 11 and terminates in a pipe section 60 which discharges directly into the distributing trough 15. The flexible section or sections in this pipe are located to permit the adjustment of the distributing trough 15 in the manner described and to facilitate the relative positioning of the two frames 16 and 11. It is also preferable to provide suitable coupling means in this line to disconnect it so that the frame 16 and tank 20 may easily be removed from beneath the vat 10 for cleaning and other purposes. The pipe 51 is connected with the pipe 57 through a T connection 61, and the common channel resulting from this union is designated as 62. The pipe 62 is used to drain the whole system into a suitable container when the machine is shut down, it being observed that this pipe is isolated when valves 54 and 59 are closed.

When the machine is in normal operation, the motor 63 runs continuously with the valves 54 and 59 closed and the valves 53 and 58 open to pump the liquid glazing material from the tank 20 into the distributing trough 15 from whence it returns in a continuous circulation in the manner described back to the tank 20. When the machine is to be shut down, the vat 10 is first drained by opening the valve 26 in the drain pipe 25 to allow the contents of the vat to run into the tank 20. Then by closing the valve 58 and opening the valve 59, with the valve 54 remaining closed, the contents of the tank 20 may be pumped through the pipes 51, 57, and 62 into a separate container for storage.

The machine may also be operated by supplying the distributing trough 15 directly from such a storage container by closing the valves 53 and 59 and opening the valves 54 and 58. This mode of operation may be utilized conveniently in starting up the machine to remove the contents of the storage container. If the storage container is on a higher level than the tank 20, the tank may be filled by gravity through the pipes 62, 51, and 52, or the pump may be started with both valves 53 and 54 open to fill the tank through the pipe 52 while the pump and the dipping vat are operating. Both the tank 20 and the dipping vat 10 may be equipped with heating means for use with those types of icings which would thicken or solidify at room temperatures. In all events, the present pumping system eliminates the manual handling and pouring of the glazing material and greatly simplifies the draining and cleaning of the system. By merely opening and closing different valves, glazing material may be pumped into or out of the system or circulated through the system, and hot water or other cleaning agents may be circulated in the same manner to clean the system.

Although the present machine has been described with particular reference to the glazing of raised doughnuts because of the shortcomings of known conventional equipment in handling comestibles of such light and buoyant characteristics, it is also adapted for treating products having different characteristics. The relative position of the delivery chute 13 over the discharge conveyor 14 enables the machine to handle less buoyant products or even products which would sink in the liquid in the vat. Various changes may be made in the construction and arrangement of parts, within the scope of the appended claims, to accommodate different kinds of products and liquid treating materials.

Having now described my invention and in what manner the same may be used, what I claim as new and desire to protect by Letters Patent is:

1. In a glazing machine, a glazing vat, means for feeding articles to be glazed into said vat, means for removing glazed articles from said vat, distributing means for glazing material between said feeding and removing means, and means for adjusting the position of said distributing means between said two means.

2. In a glazing machine and the like, a vat, a delivery chute entering into said vat, a discharge conveyor in said vat, a distributing trough for discharging a stream of liquid material into said vat, and means for adjusting the position of said distributing trough between said chute and an intermediate portion of said conveyor.

3. In a glazing machine, a glazing vat, means for maintaining a predetermined liquid level of glazing material in said vat, a delivery chute for delivering articles to be glazed into said vat to float on said liquid, a conveyor for removing said floating articles, a distributing trough adapted to discharge liquid glazing material in a sheet-like stream across the width of said vat between said chute and said conveyor on the top sides of said floating articles, and means to adjust the position of said distributing trough to cause said stream of glazing material to propel said floating articles toward said conveyor.

4. In a glazing machine, a glazing vat, a delivery chute entering into said vat, a discharge conveyor in said vat, a distributing trough for discharging a sheet-like stream of glazing material across the width of said vat, and means to support said distributing trough in adjusted positions between said chute and said conveyor to cause said stream to assist in propelling articles in said vat toward said discharge conveyor.

5. In a glazing machine, a vat for liquid glazing material, a chute for introducing articles into said vat, and a conveyor for removing articles from said vat, said conveyor being mounted on a frame having a lower end resting within said vat and an upper end resting on supports at one end of said vat so that said conveyor may be readily lifted out of said vat as a unit.

6. A glazing machine comprising a vat for receiving objects to be glazed, a supporting frame for said vat, a conveyor for said objects mounted on a conveyor frame to rest on the vat with one end in the vat, said conveyor and conveyor frame being removable from the vat as a unit, means on said supporting frame connectable with the conveyor for driving the conveyor, means mounted on said vat for distributing liquid material in said vat, a portable tank adapted to be positioned beneath said vat to receive overflow therefrom, a pump mounted with said tank, and means for connecting the outlet of said pump with said distributing means in said vat, said tank being readily removable from its operative position beneath the vat.

7. A glazing machine as defined in claim 5, an overflow outlet in said vat arranged to maintain a constant liquid level in the vat when excess liquid is supplied thereto, the lower end of said conveyor being disposed in the vat below the liquid level and substantially under the lower end of said chute, said conveyor extending away from said chute and emerging above the liquid level to pick up floating articles at a relatively short distance from said chute, and means in the vat for discharging liquid glazing material down on top of said articles after they leave the chute.

8. A glazing machine as defined in claim 5 in which said vat is elongated and said chute enters one end of said vat, said conveyor being inclined upwardly away from said one end of the vat, the lower end of said conveyor being substantially beneath said chute, and a distributing trough arranged to discharge glazing liquid down on top of said articles as they travel through the vat.

9. A glazing machine as defined in claim 5, a tank under said vat, an overflow pipe in said vat to return overflow from the vat to the tank by gravity flow, a drain pipe in the bottom of the vat to drain the vat into the tank by gravity flow, distributing means in the vat for glazing liquid, a combined drain and supply pipe for the system, and a pump; and pipes equipped with valves connecting said pump with said distributing means, with the bottom of said tank, and with said combined drain and supply pipe for the system operable selectively to fill said tank directly from said combined drain and supply pipe, to empty said tank into said combined pipe, to supply said distributing means directly from said combined pipe, and to supply said distributing means directly from said tank.

JOSEPH C. LUNSFORD.

REFERENCES CITED

The following references are of record in the file of this patent:

UNITED STATES PATENTS

| Number | Name | Date |
| --- | --- | --- |
| 1,732,180 | Brogden | Oct. 15, 1929 |
| 2,128,028 | Hampton | Aug. 23, 1938 |
| 2,417,614 | Ratcliff | Mar. 18, 1947 |

FOREIGN PATENTS

| Number | Country | Date |
| --- | --- | --- |
| 29,881 | Great Britain | Dec. 29, 1913 |